US011807199B2

United States Patent
Stephan et al.

(10) Patent No.: US 11,807,199 B2
(45) Date of Patent: Nov. 7, 2023

(54) PORTAL BRAKING SYSTEM

(71) Applicant: Super ATV, LLC, Madison, IN (US)

(72) Inventors: Jordan E. Stephan, Hanover, IN (US); Justin Eaton, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 151 days.

(21) Appl. No.: 16/796,030

(22) Filed: Feb. 20, 2020

(65) Prior Publication Data

US 2020/0269821 A1 Aug. 27, 2020

Related U.S. Application Data

(60) Provisional application No. 62/809,154, filed on Feb. 22, 2019.

(51) Int. Cl.
*F16D 55/40* (2006.01)
*B60T 1/06* (2006.01)

(52) U.S. Cl.
CPC .............. *B60T 1/065* (2013.01); *F16D 55/40* (2013.01)

(58) Field of Classification Search
CPC ........ F16D 55/36; F16D 55/40; F16D 65/186; B60T 1/065; B60B 35/001; B60K 17/043
See application file for complete search history.

(56) References Cited

U.S. PATENT DOCUMENTS

| 3,420,327 A | 1/1969 | Nallinger |
| 3,822,757 A | 7/1974 | Spence |
| 4,111,455 A | 9/1978 | Hickman |

(Continued)

FOREIGN PATENT DOCUMENTS

| GB | 1049140 | 11/1966 | |
| GB | 2026962 A | * 2/1980 | ........... B60B 35/121 |

*Primary Examiner* — Nicholas J Lane
(74) *Attorney, Agent, or Firm* — Woodard, Emhardt, Henry, Reeves & Wagner, LLP

(57) ABSTRACT

A braking system for a portal lift assembly includes a shaft operably connected to a vehicle power source and effective to directly or indirectly rotate a wheel of the vehicle upon rotation of the shaft about its axis, a piston positioned along the shaft and effective for applying an axial force along the axis of the shaft, a fluid channel fillable with a non-compressible fluid and effective to apply a hydraulic force to the piston when pressure is applied to fluid in the line, a pressure plate positioned along the shaft and effective for applying an axial force along the axis of the shaft in response to the application of an axial force by the piston. A clutch pack is positioned between the pressure plate and the piston, and includes two sets of clutch plates radially surrounding the shaft. The first set of clutch plates is connected to the shaft in a manner effective to cause those clutch plates to rotate about the axis of the shaft when the shaft rotates. The second set of clutch plates is prevented from rotating about the axis of the shaft. Members of the first set of clutch plates are interspersed between members of the second set of clutch plates, so that when the clutch pack is sufficiently compressed by axial forces applied by the piston and the pressure plate, the first set of clutch plates is forced against the second set of clutch plates so that friction forces between members of the first set of clutch plates and members of the second set of clutch plates slow and may subsequently stop the rotation of the shaft.

19 Claims, 7 Drawing Sheets

(56) References Cited

U.S. PATENT DOCUMENTS

| | | | |
|---|---|---|---|
| 4,437,530 A | 3/1984 | De Young | |
| 5,562,186 A * | 10/1996 | Osenbaugh | B60T 1/065 188/264 D |
| 5,785,218 A | 7/1998 | LaLone | |
| 6,073,731 A * | 6/2000 | Leda | F16D 55/40 188/71.5 |
| 6,254,194 B1 | 7/2001 | Capouellez | |
| 6,260,668 B1 * | 7/2001 | McClanahan | F16D 65/78 188/71.5 |
| 6,416,136 B1 | 7/2002 | Smith | |
| 6,685,275 B2 | 2/2004 | Gorges | |
| 6,817,963 B1 * | 11/2004 | Solka | B60T 1/062 184/6.12 |
| 7,458,594 B2 | 12/2008 | Kim | |
| 7,762,372 B2 | 7/2010 | LeBlanc, Sr. | |
| 7,766,353 B2 | 8/2010 | LeBlanc, Sr. | |
| 8,499,659 B2 * | 8/2013 | Benson | B60T 1/062 74/411.5 |
| 8,771,132 B2 * | 7/2014 | Fujimoto | B60K 17/046 475/311 |
| 10,889,182 B1 * | 1/2021 | Lee | B60T 1/062 |
| 2004/0200660 A1 | 10/2004 | Szalal | |
| 2006/0138740 A1 | 6/2006 | Nam | |
| 2006/0183592 A1 * | 8/2006 | Kingston | F16H 57/082 475/331 |
| 2007/0034458 A1 * | 2/2007 | Rogers | F16D 65/853 188/71.4 |
| 2007/0145816 A1 | 6/2007 | Gile | |
| 2007/0219043 A1 * | 9/2007 | Moon | B60T 1/062 475/311 |
| 2012/0181850 A1 * | 7/2012 | Armfield | B60B 35/122 301/132 |
| 2015/0298502 A1 * | 10/2015 | Ogahara | F16H 57/0486 301/6.4 |
| 2016/0178022 A1 * | 6/2016 | McGee | F16D 65/853 188/71.5 |
| 2017/0120675 A1 * | 5/2017 | Chung | B60B 35/125 |
| 2020/0231037 A1 * | 7/2020 | Stephan | B60K 17/043 |
| 2021/0172495 A1 * | 6/2021 | Mepham | F16D 13/64 |

* cited by examiner

PORTAL BRAKING SYSTEM

REFERENCE TO RELATED APPLICATIONS

This application claims priority from U.S. Provisional Patent Application Ser. No. 62/809,154, filed Feb. 22, 2019, the entire contents of which is hereby incorporated herein by reference.

FIELD OF THE INVENTION

The present invention relates generally to portal wheel ends for lifting the wheels of an off road vehicle such as an all-terrain vehicle (ATV) or a utility task vehicle (UTV), and more particularly to a brake assembly for improving the braking power and reliability of such assemblies.

BACKGROUND OF THE INVENTION

Portal boxes are known to ATV and UTV enthusiasts for providing increased ground clearance, or lift, and the low gearing needed for bigger tires. Such boxes are typically mounted to an ATV/UTV by first mounting a backing plate to the suspension of the vehicle, and by then mounting the portal box to the backing plate. U.S. Pat. No. 8,985,264 to Shirley is one example of such a device.

Among the improvements made by applicant to portal gear box assemblies are improvements designed to lengthen the wheelbase of the vehicle and to provide the ability to select among several wheelbase lengths. The connection between the portal output shaft and the associated wheel hub has also been improved by applicant to reduce vibration in the wheel.

The braking system used by portal gear boxes has not heretofore been optimized to improve braking power and reliability. The present invention addresses that need.

SUMMARY OF THE INVENTION

Briefly describing one aspect of the present invention, there is provided a braking system for a portal lift assembly. The inventive braking system includes a portal box with an input for receiving a stock axle, a linking mechanism for connecting the stock axle to an output shaft, an output shaft extending outward from the portal box and connected to the stock axle through the linking mechanism, a piston adjacent one portion of the output shaft and driven by brake fluid in a brake line, a pressure plate adjacent another portion of the output shaft and effective for resisting an axial force applied by the piston, and a clutch pack disposed between the piston and the pressure plate.

The clutch pack comprises a first set of clutch plates radially surrounding a portion of the output shaft, and a second set of clutch plates also radially surrounding a portion of the output shaft. The first set of clutch plates is connected to the output shaft in a manner effective to cause those plates to rotate about the axis of the shaft when the output shaft rotates, and the second set of clutch plates is connected to the portal box housing in a manner effective to prevent the second set of clutch plates from rotating with respect to the shaft. Members of the first set of clutch plates are interspersed between members of the second set of clutch plates, so that when the clutch pack is sufficiently compressed by axial force applied by the piston and the pressure plate, the first set of clutch plates is forced against the second set of clutch plates so that frictional forces between the two sets of plates cause the first set of plates to slow and ultimately stop.

The piston is driven by brake fluid in a brake line. When pressure is applied to the fluid in the brake line, the piston is moved against the clutch pack toward the pressure plate, thereby compressing the clutch pack and forcing the first set of clutch plates against the second set of clutch plates with a force effective to restrict or prevent the movement of the first set of clutch plates with respect to the second set of pressure plates. Since the second set of clutch plates is prevented from rotating with the shaft, this action applies a braking force to the vehicle.

A wheel hub may be mounted to the distal end portion of the output shaft, and is adapted to turn a wheel mounted to the hub upon rotation of the output shaft.

A second aspect of the present invention provides a braking system for a vehicle. As in the first embodiment, the system comprises a shaft, a piston driven by a fluid in a fluid channel, a pressure plate, and a clutch pack. The shaft is operably connected to a vehicle engine, and is effective to directly or indirectly rotate a wheel of the vehicle upon rotation of the shaft. The piston is positioned at a first position along or around the shaft, and is effective for applying an axial force in a first direction along the axis of the shaft. The piston may be moved axially along the shaft when pressure is applied to the piston by a fluid in a fluid channel, such as brake fluid in a brake line. The pressure plate is positioned at a second position along or around the shaft, and is effective for applying an axial force in a second direction opposite the first direction along the axis of the shaft in response to the application of an axial force in the first direction by the piston.

The clutch pack is positioned between the pressure plate and the piston, and comprises a first set of clutch plates radially surrounding a portion of the shaft, and a second set of clutch plates radially surrounding a portion of the shaft. The first set of clutch plates is operably connectable to the shaft in a manner effective to cause those clutch plates to rotate about the axis of the shaft when the shaft rotates, and the second set of clutch plates is prevented from rotating about the axis of the shaft. Members of the first set of clutch plates are interspersed between members of the second set of clutch plates, so that when the clutch pack is sufficiently compressed by axial forces applied by the piston and the pressure plate, the first set of clutch plates is forced against the second set of clutch plates so that the two sets of clutch plates must move together or not at all. When the piston is moved against the clutch pack toward the pressure plate, the clutch pack is compressed, thereby forcing the first set of clutch plates against the second set of clutch plates with a force effective to restrict or prevent the movement of the first set of clutch plates with respect to the second set of pressure plates, and thereby applying a braking force to the vehicle.

DESCRIPTION OF THE PREFERRED EMBODIMENTS

Figure 1:
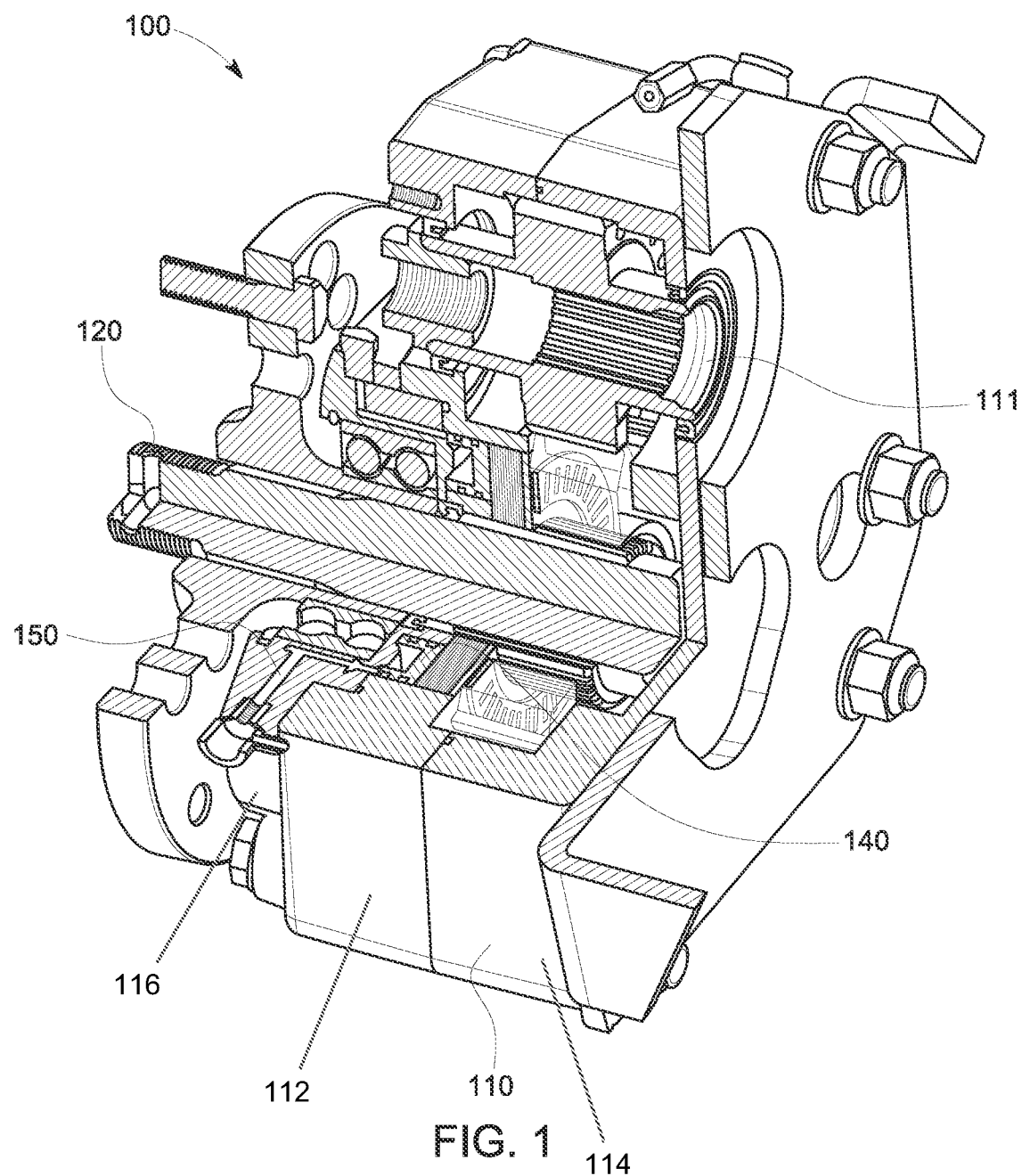
FIG. 1 is a perspective view of one embodiment of the braking system of the present invention, in partial section.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

In one embodiment the inventive braking system comprises: a) a shaft, operably connected to a vehicle power source and effective to directly or indirectly rotate a wheel of the vehicle upon rotation of the shaft; b) a piston, positioned at a first position along or around the shaft and effective for applying an axial force in a first direction along the axis of the shaft; c) a pressure plate, positioned at a second position along or around the shaft and effective for applying an axial force in a second direction opposite said first direction along the axis of the shaft in response to the application of an axial force in the first direction by the piston; and d) a clutch pack, positioned between the pressure plate and the piston, the clutch pack comprising a first set of clutch plates radially surrounding a portion of the shaft, and a second set of clutch plates radially surrounding a portion of the shaft. The system also preferably comprises a brake line effective to apply a force to the piston.

The first set of clutch plates is connected to the shaft in a manner effective to cause those clutch plates to rotate about the axis of the shaft when the shaft rotates, and the second set of clutch plates is connected to the vehicle in a manner effective to prevent those plates from rotating about the axis of the shaft. Members of the first set of clutch plates are interspersed between members of the second set of clutch plates, so that when the clutch pack is sufficiently compressed by axial forces applied by the piston and the pressure plate, the first set of clutch plates is forced against the second set of clutch plates so that the two sets of clutch plates must move together or not at all.

Accordingly, when a force is applied to the fluid in the brake line, the piston is moved against the clutch pack toward the pressure plate, thereby compressing the clutch pack and forcing the first set of clutch plates against the second set of clutch plates with a force effective to restrict or prevent the movement of the first set of clutch plates with respect to the second set of pressure plates, and thereby applying a braking force to the vehicle.

More particularly describing various elements and features of this embodiment of the inventive braking system, the invention is intended for use with vehicles that ride on wheels or tracks driven by an axle powered by an engine or other power source, such as a battery. For example, the inventive braking system finds particular utility on all-terrain vehicles and utility task vehicles, such as the ATVs and UTVs offered by Polaris, Can-Am, Yamaha, Kawasaki, Arctic Cat, Honda, and the like. These vehicles require superior braking and are frequently subjected to increased stress and torque when compared to lighter-duty vehicles.

As is conventional in the art, the vehicle has an axle that rotates around an axis to turn the wheels or tracks or otherwise to power the vehicle. In the most preferred embodiments, the axle is made of heavy duty steel or a steel alloy, such as heavy-duty 4340 chromoly steel.

The inventive braking system uses a hydraulically-activated clutch pack to slow the axle and stop the axle from rotating. The clutch pack is positioned between a piston and a pressure plate. Axial forces applied by the piston on the clutch pack compress the clutch pack and cause the clutch pack plates to be in frictional contact with each other. Increasing the compression force increases the friction forces between adjacent plates. Since one or more of the clutch plates is prevented from rotating, compressing the clutch pack applies a braking force to the axle, and thus to the vehicle.

The piston preferably surrounds the output shaft in a manner that allows it to apply a relatively even axial force to clutch plates disposed around the shaft. The piston is movable along the axis of the shaft to apply an axial force to the clutch plates. The piston is preferably advanced against the clutch plates by applying a hydraulic force to the piston. The hydraulic force is preferably applied to the piston using a brake fluid contained in a brake line, with the piston being pushed against the clutch pack when a brake pedal is pushed.

The pressure plate also preferably surrounds the output shaft in a manner that allows it to apply a relatively even axial force to clutch plates disposed around the shaft. In contrast to the piston, the pressure plate preferably does not move axially along the shaft, so the force applied by the pressure plate is in response and substantially equal to the force applied by the piston, in much the same way as a wall applies a force to a person's hand when the person pushes against the wall. Accordingly, when a force is applied to the piston, the piston moves toward the pressure plate which, being fixed against axial movement, pushes back with an equal force (less any frictional forces) to compress a clutch pack positioned between the piston and the pressure plate.

The clutch pack is disposed around the shaft between the piston and the pressure plate. The pack preferably includes two sets of clutch plates. The first set of clutch plates is operably connectable to the output shaft in a manner effective to cause those clutch plates to rotate with the output shaft. For example, tabs may be provided on the clutch plates and grooves may be provided on the shaft so that the plate tabs fit in the shaft grooves and cause the plates to turn when the shaft turns. With this connection, when the output shaft rotates the first set of clutch plates must rotate as well; and when the first set of clutch plates ceases to rotate so must the shaft.

The second set of clutch plates does not rotate with the shaft, and in fact is prevented from rotating. For example, tabs may be provided on the clutch plates and grooves or indents may be provided on the assembly housing, with the plate tabs fitting in the housing grooves/indents to prevent the plates from turning with respect to the housing. With this connection, the second set of clutch plates is prevented from rotating regardless of any rotation of the shaft.

Members of the first, rotating set of clutch plates are interspersed between members of the second, fixed set of clutch plates, so that when the clutch pack is compressed by axial force applied by the piston and the pressure plate, the first, rotating set of clutch plates is forced against the second, fixed set of clutch plates. When sufficient force is applied, the frictional forces between the two sets of clutch plates cause the rotating set of plates to slow, and ultimately stop. This slows and ultimately stops the rotation of the axle, and applies a braking force to the vehicle.

In another embodiment the inventive braking system includes: a) a portal box having a stock axle receptacle adapted to receive a stock axle shaft of an off-road vehicle; b) an output shaft operably connectable to a stock axle received in the stock axle receptacle of the portal box and effective to rotate upon rotation of the stock axle; c) a hydraulically-powered piston positioned at a first position along or around the output shaft and effective for applying an axial force in a first direction along the axis of the output shaft; and d) a pressure plate positioned at a second position along or around the output shaft and effective for applying an axial force in a second direction opposite the first direction along the axis of the output shaft in response to the application of an axial force by the piston; and e) a clutch pack positioned between the pressure plate and the piston, with the clutch pack comprising a first set of clutch plates radially surrounding a portion of the output shaft, and a second set of clutch plates radially surrounding a portion of the output shaft. The first set of clutch plates is operably connectable to the output shaft in a manner effective to cause those clutch plates to rotate with the output shaft. The second set of clutch plates does not rotate with the shaft, and in fact is prevented from rotating. Members of the first, rotating set of clutch plates are interspersed between members of the second, fixed set of clutch plates, so that when the clutch pack is compressed by axial force applied by the piston and the pressure plate, the first, rotating set of clutch plates is forced against the second, fixed set of clutch plates. When sufficient force is applied, the frictional forces between the two sets of clutch plates cause the rotating set of plates to slow, and ultimately stop.

The portal box is part of a portal gear lift, and may be original equipment or an after-market improvement to an all-terrain vehicle or a utility task vehicle, such as an ATV or UTV offered by Polaris, Can-Am, Yamaha, Kawasaki, Arctic Cat, Honda, and the like. These portal gear lifts are designed to provide lift to off-road vehicles, while reducing gearing to allow larger tires to be used with good torque.

The portal box preferably has a rear wall that is mountable to mounting hardware, such as a mounting plate, to facilitate mounting the box to the vehicle suspension. The box also preferably includes one or more sidewalls and a front cover, thus making a sealed compartment to contain the gearing that is preferably used to connect the stock axle (input shaft) to an output shaft while reducing the gear ratio. An opening for receiving the stock vehicle axle is provided in the box.

The portal gear lift box preferably includes a linking mechanism effective for operably connecting the stock axle shaft to the output shaft. The linking mechanism may comprise one or more gears, which may include an input gear operably linked to the stock axle to rotate upon rotation of the axle, and an output gear operably linked to the output shaft to rotate the shaft upon rotation of the output gear. When the input gear has a smaller diameter and number of teeth than the output gear, a unit rotation of the input gear will cause a smaller rotation of the output gear, thus using the gears to reduce the speed of rotation of the output shaft relative to the stock axle, and allowing larger tires to be run without sacrificing torque.

The input gear may be linked to the output gear by a linking gear. Alternatively, a chain or other mechanism may be used to link the input gear to the output gear. Regardless, the linking mechanism directly or indirectly connects the stock axle to the output shaft in a manner effective to cause the output shaft to rotate in the same direction as the stock axle, and preferably at a different, and most preferably slower, speed.

When the portal gear lift box is installed on a vehicle, the end of the stock axle is received in the housing receptacle of the portal box. The linking mechanism links the stock axle to the output shaft. Then, when power is applied to turn the stock axle, the linking mechanism transfers that power from the turning stock axle to the output shaft, thus causing an attached vehicle wheel to turn.

As with the previous embodiment, a piston preferably surrounds the output shaft in a manner that allows it to apply a relatively even axial force to clutch plates disposed around the shaft. The piston is movable along the axis of the shaft to apply an axial force to the clutch plates. The piston may be advanced against the clutch plates by applying a hydraulic force to the piston. The hydraulic force is preferably applied by a brake fluid contained in a brake line, with the piston being activated by conventional means.

Also as with the previous embodiment, a pressure plate preferably surrounds the output shaft in a manner that allows it to apply a relatively even axial force to clutch plates disposed around the shaft. The pressure plate preferably does not move axially along the shaft, so the force applied by the pressure plate is in response and substantially equal to the force applied by the piston. When a force is applied to the piston, the piston moves toward the pressure plate which pushes back with an equal force (less any frictional forces) to compress a clutch pack positioned between the piston and the pressure plate.

The clutch pack is disposed around the shaft between the piston and the pressure plate, and preferably includes two sets of clutch plates. The first set of clutch plates is connected to the output shaft in a manner effective to cause those clutch plates to rotate about the axis of the output shaft when the output shaft rotates, and the second set of clutch plates is prevented from rotating. Members of the first, rotating set of clutch plates are interspersed between members of the second, fixed set of clutch plates, so that when the clutch pack is sufficiently compressed by axial force applied by the piston and the pressure plate, the first set of clutch plates is forced against the second set of clutch plates and frictional forces between the two sets of clutch plates cause the rotating set of plates to slow, and ultimately stop.

A wheel hub may be mounted to the distal end portion of the output shaft. The hub is adapted to turn a wheel mounted to said wheel hub upon rotation of the output shaft. Accordingly, when the braking action slows or stops the rotation of the output shaft, the vehicle slows or stops.

Figure 2:
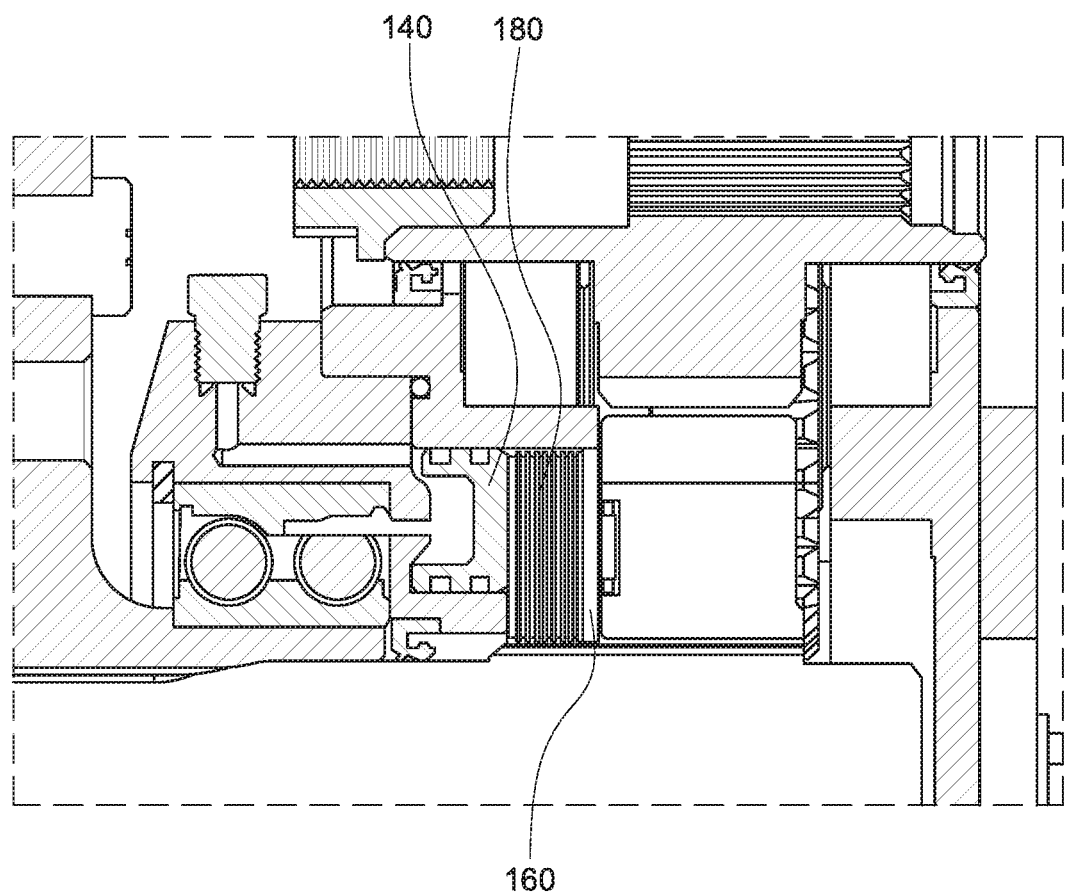
FIG. 2 is an elevational sectional view of one embodiment of the braking system of the present invention.

Referring now to the drawings, FIGS. 1 and 2 show one embodiment of the braking system of the present invention, in partial section. Braking system 100 is provided as part of a portal lift assembly for an all-terrain vehicle or a utility task vehicle (not shown). The system comprises a portal box 110 having a stock axle receptacle 111 adapted to receive a stock axle shaft of an off-road vehicle. A linking mechanism 130 is housed in portal box 110 and is effective for linking the stock axle (not shown) to an output shaft 120. When connect via linking mechanism 130 to a stock axle, output shaft 120 is rotates upon rotation of the stock axle. Portal box 110 generally includes front housing portion 112, rear housing portion 114 and face plate 116. Front housing portion 112 defines opening 113 through which output shaft 120 passes. Front housing portion 112 also defines a number of grooves 412 as described below. Face plate 116 defines opening 117 through which output shaft 120 passes. Face plate 116 covers opening 113.

Piston 140 is a caliper piston positioned at a first position along or around output shaft 120, and is effective for applying an axial force in a first direction along the axis of shaft 120. Piston 140 radially surrounds output shaft 120, but preferably does not rotate with it.

A fluid channel 150 is fillable with a non-compressible fluid effective to apply a hydraulic force to piston 140 when pressure is applied, thereby moving the piston axially in the first direction along the axis of the shaft. Face plate 116 defines fluid channel 150. A bleeder 400 is included to modify the amount and/or pressure of the fluid in the brake line.

Pressure plate 160 is positioned at a second position along or around output shaft 120, and is effective for applying an axial force in a second direction opposite said first direction along the axis of the output shaft in response to the application of an axial force in the first direction by the piston. Thrust bearing 162 is positioned between output gear 333 and pressure plate 160 to permit relative rotation between output gear 333 and pressure plate 160. In addition, thrust bearing 162 transfers axial forces applied to pressure plate 160 to output gear 333. Pressure plate 160 is maintained in a fixed position that does not rotate with said output shaft.

Figure 3:
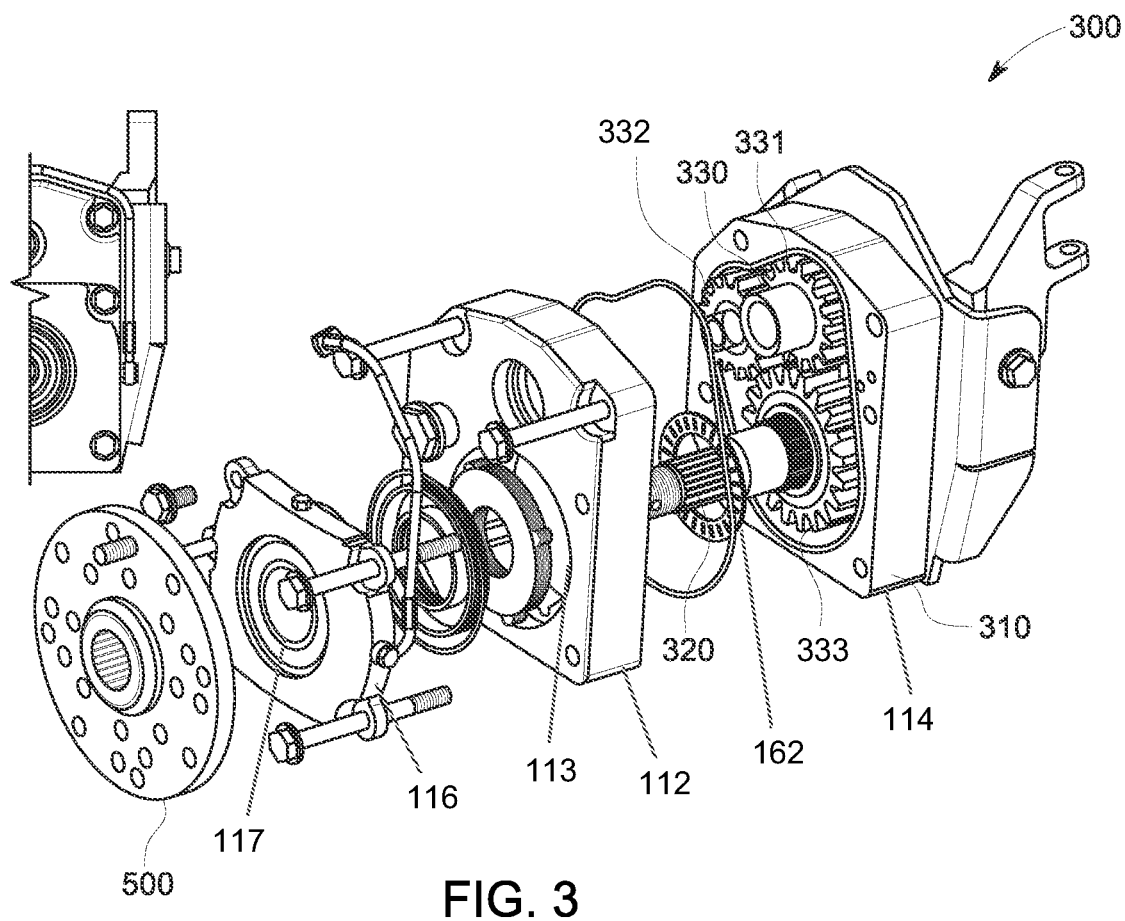
FIG. 3 is a schematic exploded view of one embodiment of the braking system of the present invention.

A clutch pack 180 is positioned between piston 140 and pressure plate 160. Clutch pack 180 comprises a first set of clutch plates 181 radially surrounding a portion of shaft 120, and a second set of clutch plates 182 radially surrounding a portion of shaft 120. As shown in FIG. 3, clutch plates 181 are selectively insertable and removable through opening 113 over output shaft 120.

The first set of clutch plates 181 is operably connectable to shaft 120 in a manner effective to cause those clutch plates to rotate about the axis of the shaft when the shaft rotates. The second set of clutch plates 182 is prevented from rotating about the axis of the shaft. The first, rotating set of clutch plates 181 are interspersed between members of the second, fixed set of clutch plates 182, so that when the clutch pack is sufficiently compressed by axial forces applied by piston 140 and pressure plate 160, the first, rotating set of clutch plates 181 is forced against the second, fixed set of clutch plates 182 so that friction forces between members of the first set of clutch plates and members of the second set of clutch plates slow and may subsequently stop the rotation of the shaft.

FIG. 3 is a schematic exploded view of one embodiment of the braking system of the present invention. Portal box 310 has a stock axle receptacle 311 adapted to receive a stock axle shaft of an off-road vehicle. A linking mechanism 330 is housed in portal box 310 and is effective for linking the stock axle (not shown) to an output shaft 320. When connect via linking mechanism 330 to a stock axle, output shaft 320 is rotates upon rotation of the stock axle.

Piston 340 is positioned at a first position along or around output shaft 320, and is effective for applying an axial force in a first direction along the axis of shaft 320. A fluid channel 350 is fillable with a non-compressible fluid effective to apply a hydraulic force to piston 340 when pressure is applied, thereby moving the piston axially in the first direction along the axis of the shaft.

Pressure plate 360 is positioned at a second position along or around output shaft 320, and is effective for applying an axial force in a second direction opposite said first direction along the axis of the output shaft in response to the application of an axial force in the first direction by the piston. The pressure plate does not move along the axis of the shaft, and does rotate about the axis of the shaft. Instead, the pressure plate remains in a fixed position with respect to the other assembly components.

A clutch pack 380 is positioned between piston 340 and pressure plate 360. Clutch pack 380 comprises a first set of clutch plates 381 radially surrounding a portion of shaft 320, and a second set of clutch plates 382 radially surrounding a portion of shaft 320.

The first set of clutch plates 381 is operably connectable to shaft 320 in a manner effective to cause those clutch plates to rotate about the axis of the shaft when the shaft rotates. The second set of clutch plates 382 is prevented from rotating about the axis of the shaft. The first, rotating set of clutch plates 381 are interspersed between members of the second, fixed set of clutch plates 382, so that when the clutch pack is sufficiently compressed by axial forces applied by piston 340 and pressure plate 360, the first, rotating set of clutch plates 381 is forced against the second, fixed set of clutch plates 382 so that friction forces between members of the first set of clutch plates and members of the second set of clutch plates slow and may subsequently stop the rotation of the shaft.

Wheel hub 500 is adapted to receive a distal end portion of output shaft 220, and is effective to turn a wheel mounted to the hub upon rotation of the shaft.

Linking mechanism 330 comprises one or more gears. Input gear 331 is operably linked to the stock axle to rotate upon rotation of the axle. Output gear 333 is operably linked to input gear 331 so that gear 331 rotates in the same direction as the stock axle. Linking gear 332 connects input gear 331 to output gear 333. The gears are sized such that output shaft 320 rotates at a slower speed than the stock axle.

Figure 4:
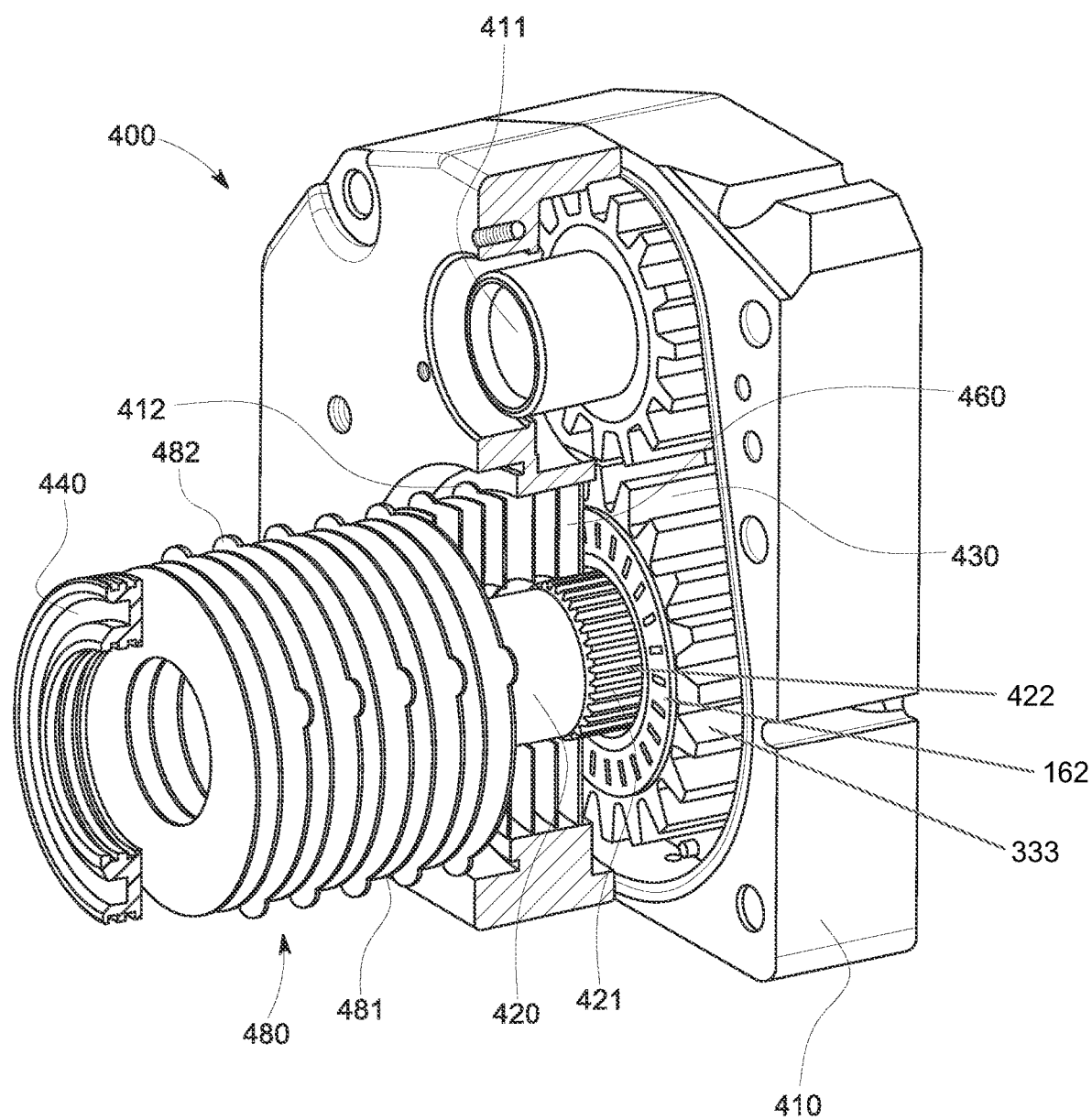
FIG. 4 is a perspective view of the housing, input gear, output gear, output shaft, pressure plate, clutch pack, and piston of one embodiment of the present invention, in partial section.
Figure 5:
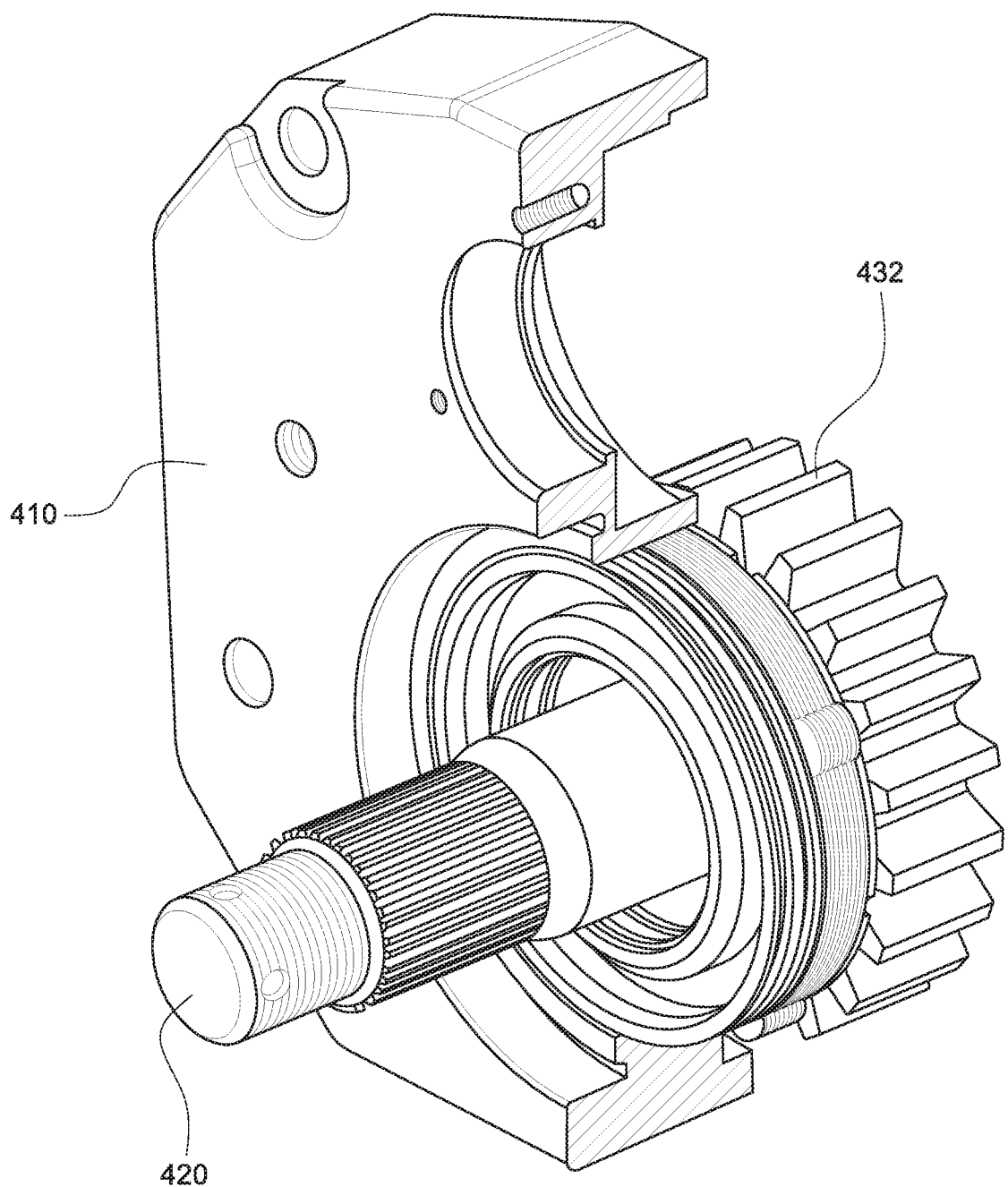
FIG. 5 is a perspective view of the outer housing cover, output gear, output shaft, and clutch pack of one embodiment of the braking system of the present invention, in partial section.
Figure 6:
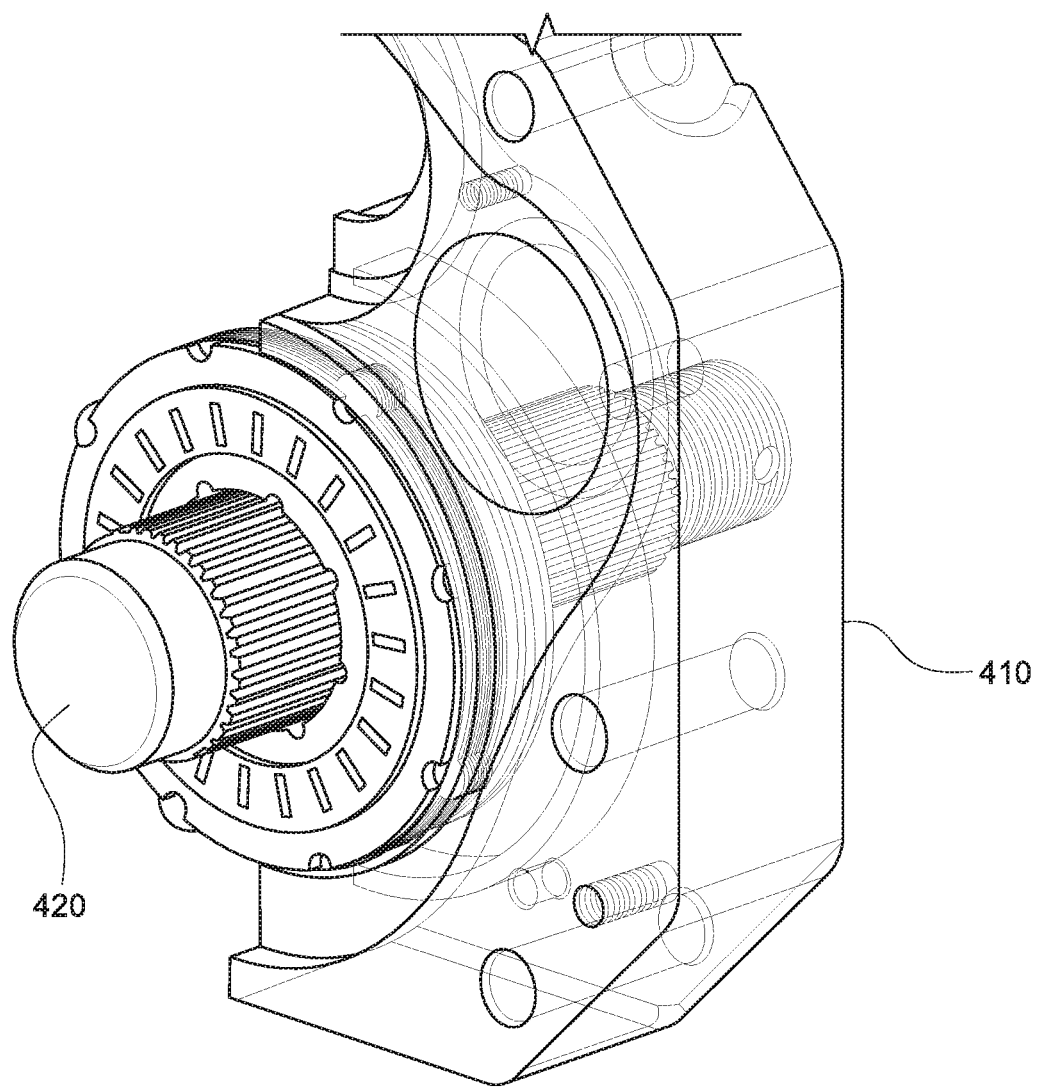
FIG. 6 is a perspective view of the housing, output shaft, and clutch pack of one embodiment of the present invention, in partial section.

Referring to FIGS. 4-6, braking system 400 is provided for a portal lift assembly for an all-terrain vehicle or a utility task vehicle. The system 400 comprises a portal box 410 having a stock axle receptacle 411 adapted to receive a stock axle shaft 600 of an off-road vehicle. A linking mechanism 430 is housed in portal box 410 and is effective for linking stock axle 600 to an output shaft. An output shaft 420 is operably connectable via linking mechanism 430 to stock axle 600, and is adapted to rotate upon rotation of the stock axle. A piston 440 is positioned at a first position along or around output shaft 420, and is effective for applying an axial force in a first direction along the axis of the output shaft. A fluid channel 450 is fillable with a non-compressible fluid, and is effective to apply a hydraulic force to piston 440 when pressure is applied to the fluid, thereby moving the piston axially along the axis of the shaft.

A pressure plate 460 is positioned at a second position along or around output shaft 420, and is effective for applying an axial force in a second direction opposite said first direction along the axis of the output shaft in response to the application of an axial force in the first direction by the piston.

A clutch pack 480 is positioned between pressure plate 460 and piston 440. Clutch pack 480 comprises a first set 481 of clutch plates radially surrounding first portions of shaft 420, and a second set 482 of clutch plates radially surrounding second portions of shaft 420. The first set 481 of clutch plates is operably connectable to the shaft in a manner effective to cause those clutch plates to rotate about the axis of the shaft when the shaft rotates. The second set 482 of clutch plates is prevented from rotating about the axis of the shaft. The members of the first set 481 of clutch plates are interspersed between members of the second set 482 of clutch plates, so that when the clutch pack is sufficiently compressed by axial forces applied by said piston and said pressure plate, the first set of clutch plates is forced against the second set of clutch plates so that friction forces between members of the first set of clutch plates and members of the second set of clutch plates slow and may subsequently stop the rotation of the shaft.

In the illustrated embodiment the output shaft 420 includes a splined portion 421 having as multiplicity of teeth 422 and the first set 481 of clutch plates has a corresponding multiplicity of teeth 483 adapted to mate with the teeth 422 on the splined portion of the output shaft so that engagement of the splined shaft teeth with the clutch plate teeth causes the first set of clutch plates to rotate with the output shaft. Teeth 422 also engage output gear 333 so that output gear 333 rotates with output shaft 420. This structure provides a structure for connecting each of the first set of clutch plates to the shaft in a manner effective to cause those clutch plates to rotate about the axis of the shaft when the shaft rotates.

Similarly, portal box housing includes a set of grooves 412 and the second set 482 of clutch plates has a corresponding set of tabs 484 adapted to mate with the grooves 412 in the housing so that engagement of the tabs in the grooves prevents the second set of clutch plates from rotating with respect to the housing.

Figure 7:
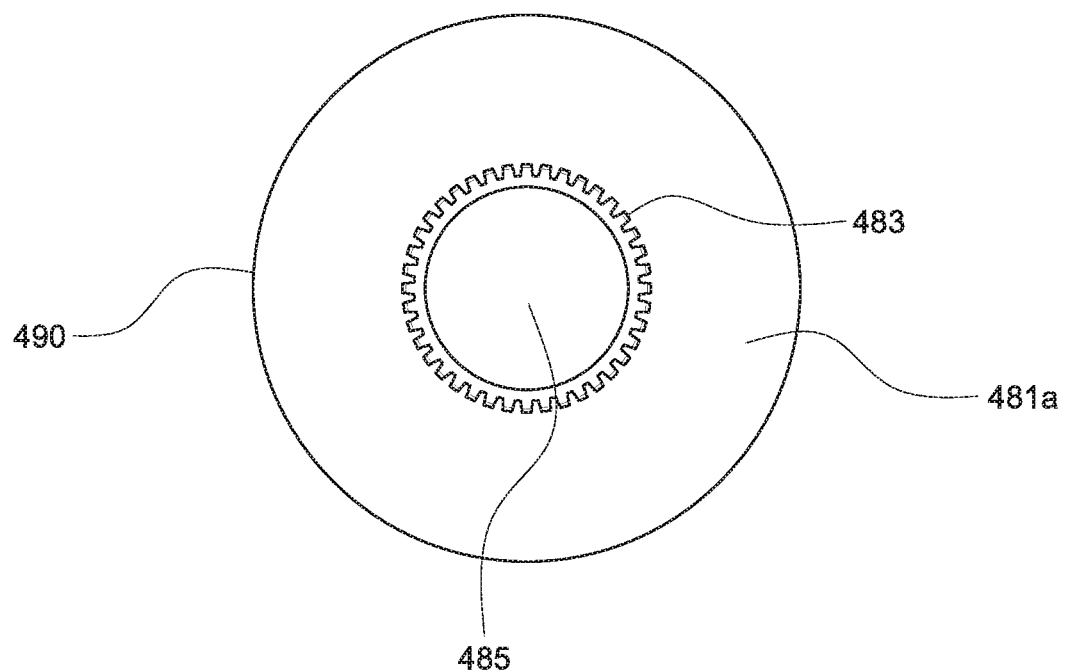
FIG. 7 is a plan view of one of a first set of clutch plates from a clutch pack used in certain embodiments of the present invention.
Figure 8:
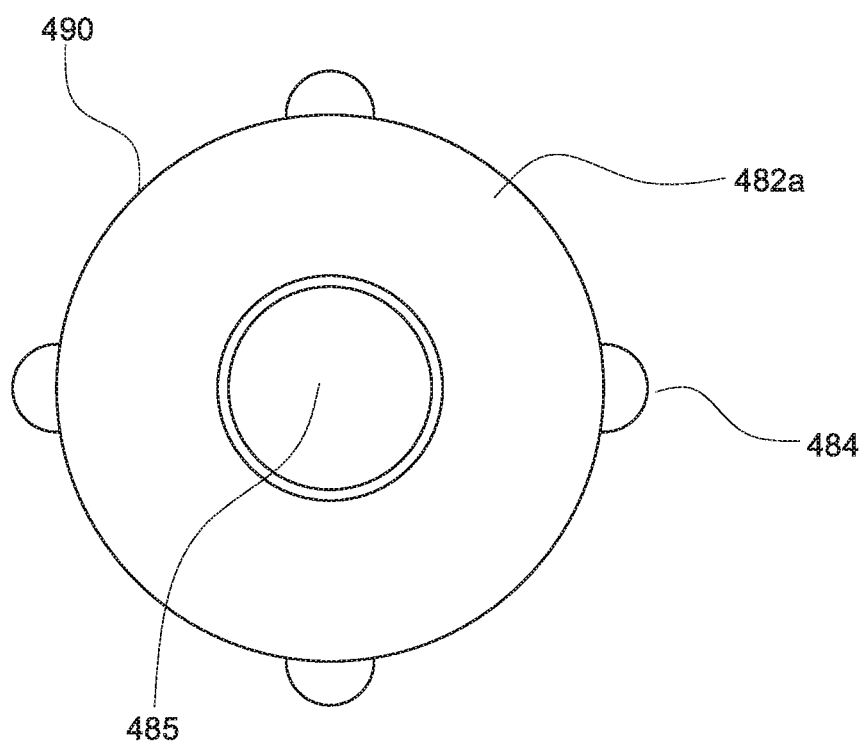
FIG. 8 is a plan view of one of a second set of clutch plates from a clutch pack used in certain embodiments of the present invention.

FIGS. 7 and 8 illustrate preferred embodiments of the first and second sets of clutch plates. In FIG. 7, one member of the first set 481 of clutch plates is illustrated, with plate 481*a* having a central opening 485 adapted to surround an output shaft. In the illustrated embodiment central opening 485 includes a multiplicity of teeth 483 adapted to mate with teeth on a splined portion of the output shaft so that engagement of the splined shaft teeth with the clutch plate teeth causes the first set of clutch plates to rotate with the output shaft.

In FIG. 8, one member of the second set 482 of clutch plates is illustrated, with plate 482*a* having a central opening 485 adapted to surround an output shaft. In plate 482*a*, central opening 485 is smooth to allow an output shaft to spin freely within opening 485 even when the members of the first set 481 of clutch plates are engaged with the shaft. The outer surface 490 of plate 482*a* includes tabs 484 adapted to mate with the grooves 412 in the housing so that engagement of the tabs in the grooves prevents the second set of clutch plates from rotating with respect to the housing.

It is to be appreciated that the description provided herein frequently refers to the piston and/or the pressure plate as applying an axial force "along" the axis of the shaft. Since these forces are being applied by structures (a piston and/or a pressure plate) that preferably surround the shaft, and that extend radially from the outer surface of the shaft, it is to be appreciated that these forces may not be applied through the shaft itself, and by some definitions may therefore not literally be applied along the axis of the shaft. Therefore, as would be recognized by persons skilled in the art, for the purposes of this description and claims, forces that are applied axially "along the axis of the shaft" would include forces that are applied in a direction that is substantially parallel to the axis of the shaft, and in relatively close proximity to it.

Similarly, the description provided herein frequently refers to the second set of clutch plates as being prevented from rotating about the axis of the shaft. This does not mean that the whole assembly cannot be rotated as a unit about the axis of the shaft, although such movement does not occur when the assembly is used on a vehicle, and is therefore not reasonably relevant to a description of the invention. Instead, as would be recognized by persons skilled in the art, describing the second set of clutch plates as being prevented from rotating about the axis of the shaft means that the second set of clutch plates is prevented from rotating about the axis of the shaft when the assembly is mounted to a vehicle and the entire vehicle is not being rotated. This is typically accomplished by attaching or connecting the second set of plates to the housing or other structure in some manner such that the second set of plates does not rotate with respect to the housing.

While the invention has been illustrated and described in detail in the drawings and foregoing description, the same are to be considered as illustrative and not restrictive, it being understood that only certain preferred embodiments have been shown and described and that all changes and modifications that come within the spirit of the invention are desired to be protected. In addition, it is to be appreciated that the present invention may comprise or consist essentially of any or all of the described or illustrated features. For example, the present invention includes devices and methods comprising any or all of the features described or illustrated in specification or drawings, and the present invention includes devices and methods consisting essentially of any or all of the features illustrated in the specification or drawings. Additionally, any or all of the features and/or embodiments disclosed herein may be combined with any or all of the other features and/or embodiments disclosed herein to provide a device or method that comprises or consists essentially of such features.

Finally, the grammatical device "and/or" (such as in "A and/or B") is used in this disclosure to mean A alone, or B alone, or both A and B.

The invention claimed is:

1. A braking system for a portal lift assembly for an all-terrain vehicle or a utility task vehicle, the system comprising:
   a) a portal box housing having a stock axle receptacle adapted to receive a stock axle shaft of an off-road vehicle, wherein the portal box housing defines a first opening;
   b) a linking mechanism housed in said portal box housing and effective for linking the stock axle received in the stock axle receptacle to an output shaft, wherein the linking mechanism comprises an input gear, an output gear, and a linking gear contained in the housing;
   c) an output shaft operably connectable via said linking mechanism to a stock axle received in the stock axle receptacle, and effective to rotate upon rotation of the stock axle, wherein the output shaft extends through the first opening;
   d) a piston positioned at a first position in the portal box housing along or around said output shaft and effective for applying an axial force in a first direction along the axis of the output shaft;
   e) a fluid channel fillable with a non-compressible fluid and effective to apply a hydraulic force to said piston when pressure is applied to fluid in the line, thereby moving the piston axially in said first direction along the axis of the shaft;
   f) a pressure plate positioned at a second position in the portal box housing along or around said output shaft and effective for applying an axial force in a second direction opposite said first direction along the axis of the output shaft in response to the application of an axial force in said first direction by said piston;

g) a clutch pack positioned in the portal box housing between said pressure plate and said piston, said clutch pack comprising a first set of clutch plates radially surrounding a portion of said shaft, and a second set of clutch plates radially surrounding a portion of said shaft, wherein the first set of clutch plates is splined directly to the output shaft in a manner effective to cause those clutch plates to rotate about the axis of the shaft when the shaft rotates, and wherein the second set of clutch plates are rotationally coupled to the portal box housing which prevents the second set of clutch plates from rotating about the axis of the shaft, and wherein members of the first set of clutch plates are interspersed between members of the second set of clutch plates, so that when the clutch pack is sufficiently compressed by axial forces applied by said piston and said pressure plate, the first set of clutch plates is forced against the second set of clutch plates so that friction forces between members of the first set of clutch plates and members of the second set of clutch plates slow and may subsequently stop the rotation of the shaft, and wherein the clutch pack is selectively insertable and removable through the first opening over the output shaft.

2. The braking system according to claim 1 wherein the system further includes a wheel hub adapted to receive a distal end portion of said output shaft, and adapted to turn a wheel mounted to said wheel hub upon rotation of the output shaft.

3. The braking system according to claim 2 wherein said input gear is operably linked to said stock axle to rotate upon rotation of said stock axle, and said output gear is operably linked to said input gear to rotate in the same direction as said stock axle.

4. The braking system according to claim 1 wherein said linking mechanism directly or indirectly connects said stock axle to said output shaft in a manner effective to cause said output shaft to rotate at a slower speed than said stock axle.

5. The braking system according to claim 1 wherein said system further includes an end of a stock axle received in said housing receptacle.

6. The braking system according to claim 1 wherein said pressure plate is maintained in a fixed position that does not rotate with said output shaft.

7. The braking system according to claim 1 wherein said piston radially surrounds said output shaft.

8. The braking system according to claim 1 wherein said closed fluid channel is the stock brake line of said vehicle.

9. The braking system according to claim 1 wherein said output shaft includes a splined portion having as multiplicity of teeth and the first set of clutch plates has a corresponding multiplicity of teeth adapted to mate with the teeth on the splined portion of the output shaft so that engagement of the splined shaft teeth with the clutch plate teeth causes the first set of clutch plates to rotate with the output shaft.

10. The braking system according to claim 1 wherein said portal box housing includes a set of grooves and the second set of clutch plates has a corresponding set of tabs adapted to mate with the grooves in the housing so that engagement of the tabs in the grooves prevents the second set of clutch plates from rotating with respect to the housing.

11. The braking system according to claim 2, further comprising a face plate that defines a second opening, wherein the face plate covers the first opening and wherein the output shaft extends through the second opening.

12. The braking system according to claim 11, wherein removing the face plate and wheel hub provides access to the first opening such that the clutch pack is selectively removable and insertable through the first opening over the output shaft.

13. The braking system according to claim 11, wherein the face plate defines at least a portion of the fluid channel.

14. The braking system according to claim 1, further comprising a thrust bearing positioned between the output gear and the pressure plate, wherein the hydraulic force applied to said piston transfers through the clutch pack, the pressure plate and the thrust bearing to the output gear.

15. The braking system according to claim 1, wherein the portal pox housing defines a groove that extends through the first opening and wherein the second set of clutch plates comprise a spline that mates with the groove to rotationally couple the second set of clutch plates to the housing.

16. The braking system according to claim 1, wherein the output shaft comprises a tooth and wherein the output gear and the first set of clutch plates are both splined on the tooth.

17. The braking system according to claim 1, wherein the portal box housing comprised a rear housing portion and a front housing portion, wherein separating the rear housing portion from the front housing portion facilitates access to the linking mechanism, wherein the first opening is in the front housing portion, and wherein the braking system further comprises a face plate that defines a second opening, wherein the face plate covers the first opening and wherein the output shaft extends through the second opening.

18. The braking system according to claim 17, wherein removing the face plate provides access to the first opening such that the clutch pack is selectively removable and insertable through the first opening over the output shaft while the rear housing portion and front housing portion are coupled together.

19. The braking system according to claim 18, wherein removing the output gear requires separating the rear housing portion from the front housing portion.

* * * * *